United States Patent
Buffard et al.

(12)

(10) Patent No.: US 6,596,380 B1
(45) Date of Patent: Jul. 22, 2003

(54) ANTIADHESIVE COATING WITH IMPROVED SCRATCH RESISTANCE

(75) Inventors: Jean-Pierre Buffard, Aix les Bains (FR); Michel Fontaine, Sales (FR); Claudine Gardaz, Rumilly (FR)

(73) Assignee: Seb SA (FR)

( * ) Notice: Subject to any disclaimer, the term of this patent is extended or adjusted under 35 U.S.C. 154(b) by 0 days.

(21) Appl. No.: 09/936,496

(22) PCT Filed: Mar. 15, 2000

(86) PCT No.: PCT/FR00/00626

§ 371 (c)(1),
(2), (4) Date: Sep. 12, 2001

(87) PCT Pub. No.: WO00/54896

PCT Pub. Date: Sep. 21, 2000

(30) Foreign Application Priority Data

Mar. 16, 1999 (FR) .............................................. 99 03242

(51) Int. Cl.[7] .......................... B32B 5/16; B32B 27/08; B32B 27/30; B32B 27/34; B32B 31/26
(52) U.S. Cl. ..................... 428/201; 428/335; 428/411.1; 428/473.5; 428/474.4; 428/422; 427/202; 427/282; 427/374.2; 427/385.5; 427/388.1; 427/409; 427/470
(58) Field of Search ................................ 428/335, 201, 428/411.1, 422, 421, 419, 474.4, 473.5, 524; 427/470, 202, 374.2, 385.5, 388.1, 409, 282

(56) References Cited

U.S. PATENT DOCUMENTS

| | | | | |
|---|---|---|---|---|
| 4,147,683 A | * | 4/1979 | Vassiliou et al. | 428/422 |
| 4,546,141 A | | 10/1985 | Gebauer | 524/401 |
| 5,536,583 A | | 7/1996 | Roberts et al. | 428/457 |
| 5,846,645 A | | 12/1998 | Yokota et al. | 428/327 |
| 6,382,545 B1 | * | 5/2002 | Yeh | 220/573.1 |

FOREIGN PATENT DOCUMENTS

| | | |
|---|---|---|
| EP | 0100889 | 2/1984 |
| EP | 0343282 | 11/1989 |
| EP | 0367884 | 5/1990 |
| EP | 0786290 | 7/1997 |
| WO | WO 89/00757 | 1/1989 |

* cited by examiner

*Primary Examiner*—Ramsey Zacharia
(74) *Attorney, Agent, or Firm*—Bachman & LaPointe, P.C.

(57) ABSTRACT

A non-stick coating with improved scratch resistance comprises an undercoat applied to a substrate, coated with a primary coat comprising a fluorocarbon resin and one or more fluorocarbon resin-based outer coats. The undercoat comprises at least 50% by weight of the polymer oxy-1,4-phenylene-oxy-1,4-phenylene-carbonyl-1,4-phenylene, known as PEEK, and is free of fluorocarbon resin.

7 Claims, No Drawings

ANTIADHESIVE COATING WITH IMPROVED SCRATCH RESISTANCE

BACKGROUND OF THE INVENTION

The present invention relates to a non-stick coating with improved scratch resistance.

Non-stick coatings applied to cookware are known. Such coatings are also known to be prone to scratching.

Such coatings are routinely applied to a hard undercoat of alumina, enamel, stainless steel or polyamide-imide (PAI) to improve their scratch resistance.

In principle, that undercoat forms a barrier that prevents scratches from reaching the surface of the substrate.

SUMMARY OF THE INVENTION

The present invention aims to provide a non-stick coating with a scratch resistance that is improved over known coatings, while retaining excellent non-stick properties.

The invention provides a non-stick coating with improved scratch resistance, comprising an undercoat applied to a substrate, coated with a primary coat comprising a fluorocarbon resin and one or more fluorocarbon resin-based outer coats.

DETAILED DESCRIPTION OF THE PREFERRED EMBODIMENT

The coating of the invention is characterized in that said undercoat comprises at least 50% of the polymer oxy-1,4-phenylene-oxy-1,4-phenylene-carbonyl-1,4-phenylene, known as PEEK, polyetheretherketone, this undercoat being free of fluorocarbon resin.

The formula for this polymer is:

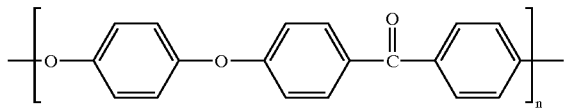

The remaining proportion can be composed of:

thermostable polymers used pure or as a mixture, such as polyphenylene sulfide, polyetherimide, polyimide, polyetherketone, polyethersulfone or polyamide-imide;

inert fillers such as metal oxides, silica, mica particles or flaked fillers.

PEEK has already been used in non-stick coating formulations, mixed with a fluorocarbon resin such as polytetrafluoroethylene (PTFE).

However, PEEK has never been used without it being mixed with a fluorocarbon resin to constitute a hard undercoat.

It has surprisingly been ascertained that a non-stick coating applied to a PEEK-based undercoat exhibits improved scratch resistance.

Metal spatulas can therefore be used with the non-stick coating.

It has been ascertained that the PEEK undercoat covers 60% to 95% of the total coated surface of the substrate.

The mechanical characteristics of this mixed undercoat are such that they remove scratches made by metal as metal spatulas are used.

This represents an ideal compromise that can improve both the hardness of aluminum and the elasticity of the PTFE.

It should be noted here that the network could become continuous over a rough surface, or it could cover less than 60% without having any impact on the invention.

Depending on the case, the thickness of said undercoat could be between 5 microns and 100 microns.

The fluorocarbon resin used in the primary coat and in the outer coat or coats is preferably polytetrafluoroethylene (PTFE) or a PTFE/PFA mixture.

The invention is of particular application to cookware coated externally or internally with a non-stick coating applied over an undercoat comprising at least 50% by weight of PEEK.

The substrate for said cookware can be aluminum, stainless steel, glass, pottery or enamel.

Before applying the PEEK-based undercoat, the substrate may or may not be chemically treated, for example by acid attack, or it may or may not be mechanically treated, for example by sand blasting.

The mixed undercoat can be applied to the substrate at ambient temperature, or it can be heated to about 450° C., in the form of a powder or a dispersion.

It can also be applied by screen printing or pad printing as a paste, in which case the applied undercoat may have the following composition:

|  | parts by weight |
|---|---|
| Mixture of PEEK + polymers and/or inert fillers | 30 to 400 |
| Thickener | 1 to 10 |
| Diluent | 10 to 450 |
| Water | 100 to 300 |

The constituents other than the PEEK or polymers and/or inert fillers disappear during curing.

The thermostable polymers, which behave as co-binders, improve adhesion of the undercoat to the support.

The effect of the inert fillers is to increase the roughness and/or hardness of the undercoat. The scratch and abrasion resistance of the coating are thus improved.

Further, by combining thermostable polymers, which result in reducing the hardness of the undercoat, with inert fillers, the hardness of the undercoat can be adjusted.

Finally, using inert fillers in the constitution of the undercoat is of considerable commercial interest because of their low cost.

The grain size of the PEEK powder used can be in the range 4 microns ($\mu$m) to 80 $\mu$m, with a mean grain size of about 20 $\mu$m.

Depending on the mode of application, it may be necessary to:

heat said undercoat to a temperature of at least 260° C.;

apply the PTFE-based primary coat and outer coat or coats to said undercoat in succession; and cure the coat assembly at 400° C.–420° C.

An example will now be given of the composition of the coats that are applied in succession to the PEEK undercoat:

| Constituents | Parts by weight |
|---|---|
| PRIMARY COAT | |
| Aqueous dispersion of polyamide-imide, about 13% dry extract | 100 to 500 |
| N-methylpyrrolidone | 100 |
| PTFE dispersion, 60% dry extract | 100 to 400 |
| Water | 100 |
| Carbon black, 20% dry extract | 20–30 |
| Colloidal silica, 30% dry extract | 10-200 |
| INTERMEDIATE OUTER COAT | |
| PTFE dispersion, 60% dry extract | 80 to 90 |
| PFA 6900 dispersion, 50% dry extract | 0.5 to 5.0 |
| Distributing and film-forming agent | 1 to 20 |
| $TiO_2$-coated mica flakes | 0.1 to 0.4 |
| Derusol (carbon black, 25% dry extract) | 0.02 to 0.6 |
| UPPERMOST OUTER COAT | |
| PTFE dispersion, 60% dry extract | 80 to 90 |
| Distributing and film-forming agent | 1 to 20 |
| $TiO_2$-coated mica flakes | 0.1 to 0.4 |

After drying, the above assembly of coats was sintered at 400–420° C. for 5 to 10 minutes.

A non-stick coating with improved properties was obtained.

Hardness measurements carried out in accordance with French standard NF 21-511 at different temperatures produced the following results and are compared with a conventional coating:

| Hardness PTFE coating with PEEK | 20° C. | 100° C. | 180° C. |
|---|---|---|---|
| Ball indentation test | 3.4 kg | 3.4 kg | 1.7–2.0 kg |
| Conventional coating, no undercoat | 1.8 kg | 1.7 kg | 1.6 kg |

In particular, when used in a real food cooking situation, the performance as regards resistance to attack by metal spatulas was astonishing. After cooking, grilling and frying cycles carried out with different foods that corresponded to 2 years of use, the coating surface was hardly scratched, and the metal had not been reached.

This constitutes the first coating plus undercoat system that genuinely provides improved scratch resistance when used with metal utensils (with the exception of knives); until now, none of the undercoats tested provided a satisfactory solution (plasma, alumina, titanium, anodizing, and other surface treatments).

Clearly, this improvement in scratch resistance can be applied in all fields, providing external and internal coatings for cookware and household electrical appliances (hotplates, grill plates) and on all smooth surfaces, for example irons.

Clearly, the invention is not limited to the example described above and many modifications can be made in this regard without departing from the spirit and ambit of the invention.

What is claimed is:

1. A non-stick coating with improved scratch resistance, comprising an undercoat applied to a substrate, a primary coat comprising a fluorocarbon resin applied to said undercoat and at least one fluorocarbon resin-based outer coat, said undercoat comprising at least 50% by weight of the polymer oxy-1,4-phlenylene-oxy-1,4-phenylene-carbonyl-1,4-phenylene, known as PEEK; and a remaining proportion being composed of thermostable polymers used pure or as a mixture, and inert fillers selected from the group consisting of metal oxides, silica, mica particles, and flaked fillers; and said undercoat being free of fluorocarbon resin, said coats having been sintered at temperatures of 400–420° C., and wherein said thermostable polymers are selected from the group consisting of polyphenylene sulfide, polyetherimide, polyimide, polyamide-imide, and mixtures thereof.

2. A coating according to claim 1, wherein the undercoat constituted by said PEEK covers 60% to 95% of the total coated surface of the substrate.

3. A coating according to claim 1, wherein the thickness of said undercoat is in the range of 5 $\mu$m to 100 $\mu$m.

4. A coating according to claim 1, wherein said fluorocarbon resin is polytetrafluoroethylene (PTFE) or a PTFE-PFA (perfluoroalkyl vinyl ether) mixture.

5. Cookware coated with a coating comprising an undercoat applied to a substrate, a primary coat comprising a fluorocarbon resin applied to said undercoat and at least one fluorocarbon resin-based outer coat, said undercoat comprising at least 50% by weight of the polymer oxy-1,4-phenylene-oxy-1,4-phenylene-carbonyl-1,4-phenylene, known as PEEK; and a remaining proportion being composed of thermostable polymers used pure or as a mixture, and inert fillers selected from the group consisting of metal oxides, silica, mica particles, and flaked fillers; and said undercoat being free of fluorocarbon resin, said coats having been sintered at temperatures of 400–420° C., and wherein said thermostable polymers are selected from the group consisting of polyphenylene sulfide, polyetherimide, polyimide, polyamide-imide, and mixtures thereof.

6. A method of applying a non-stick coating with improved scratch resistance comprising the steps of:

applying an undercoat to a substrate, said undercoat comprising at least 50% by weight of the polymer oxy-1,4-phenylene-oxy-1,4-phenylene-carbonyl-1,4-phenylene, known as PEEK; and a remaining proportion being composed of thermostable polymers used pure or as a mixture, and inert fillers selected from the group consisting of metal oxides, silica, mica particles or flaked fillers; and said undercoat being free of fluorocarbon resin;

fusing said undercoat at a temperature of at least 340° C.;

applying to said undercoat a primary coat comprising a fluorocarbon resin and at least one fluorocarbon resin-based outer coat in succession to said undercoat; and sintering the coats at a temperature in the range of 400–420° C., and wherein said thermostable polymers are selected from the group consisting of polyphenylene sulfide, polyetherimide, polyimide, polyamide-imide, and mixtures thereof.

7. A method according to claim 6, wherein said PEEK applying step comprises applying the PEEK in the form of a powder with a grain size in the range of 4 $\mu$m to 80 $\mu$m and a mean grain size of about 20 $\mu$m.

* * * * *